US011153158B2

(12) United States Patent
Liu et al.

(10) Patent No.: US 11,153,158 B2
(45) Date of Patent: Oct. 19, 2021

(54) METHOD FOR CONFIGURING A FREQUENCY PRIORITY, TERMINAL DEVICE, BASE STATION, AND CORE NETWORK DEVICE

(71) Applicant: Guangdong OPPO Mobile Telecommunications Corp., Ltd., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 263 days.

(21) Appl. No.: 16/464,044

(22) PCT Filed: Sep. 15, 2017

(86) PCT No.: PCT/CN2017/101962
§ 371 (c)(1),
(2) Date: May 24, 2019

(87) PCT Pub. No.: WO2019/051811
PCT Pub. Date: Mar. 21, 2019

(65) Prior Publication Data
US 2019/0386874 A1  Dec. 19, 2019

(51) Int. Cl.
*H04L 12/24*     (2006.01)
*H04W 76/27*     (2018.01)
(Continued)

(52) U.S. Cl.
CPC ..... *H04L 41/0813* (2013.01); *H04W 36/0055* (2013.01); *H04W 48/16* (2013.01);
(Continued)

(58) Field of Classification Search
None
See application file for complete search history.

(56) References Cited

U.S. PATENT DOCUMENTS

| 2011/0059733 A1 | 3/2011 | Kim et al. |
| 2014/0086177 A1* | 3/2014 | Adjakple ............... H04L 67/10 370/329 |

(Continued)

FOREIGN PATENT DOCUMENTS

| CN | 102045685 C | 5/2011 |
| CN | 106341893 A | 1/2017 |

(Continued)

OTHER PUBLICATIONS

3GPP TSG-SA WG2 Meeting #122bis; Sophia Antipolis, France. Aug. 21-25, 2017; S2-176067.
(Continued)

*Primary Examiner* — Ayaz R Sheikh
*Assistant Examiner* — Faiyazkhan Ghafoerkhan
(74) *Attorney, Agent, or Firm* — Young Basile Hanlon & MacFarlane, P.C.

(57) ABSTRACT

A method for configuring a frequency priority, a terminal device, a base station and a core network device are provided. When the base station or the core network device configures information of a frequency priority, information of a frequency corresponding to a network slice registered by the terminal device is considered. The method includes: transmitting a first request message to a core network device, wherein the first request message is used for requesting information of a network slice registered by a terminal device; receiving a response message transmitted by the core network device for the first request message, wherein the response message includes the information of the network slice registered by the terminal device; configuring information of a frequency priority for the terminal device (Continued)

500 — A terminal device receives information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state — 510

The terminal device selects a frequency to reside at according to the information of the frequency priority when re-entering the connected state from the idle state or the inactive state — 520 according to the response message; and transmitting the configured information of the frequency priority to the terminal device.

16 Claims, 10 Drawing Sheets

(51) Int. Cl.
*H04W 36/00* (2009.01)
*H04W 48/16* (2009.01)
*H04W 72/04* (2009.01)
*H04W 72/10* (2009.01)

(52) U.S. Cl.
CPC ....... *H04W 72/0453* (2013.01); *H04W 72/10* (2013.01); *H04W 76/27* (2018.02)

(56) References Cited

U.S. PATENT DOCUMENTS

| | | | |
|---|---|---|---|
| 2015/0100856 A1 | 4/2015 | Zhang et al. | |
| 2016/0302118 A1 | 10/2016 | Yiu et al. | |
| 2016/0352645 A1 | 12/2016 | Senarath et al. | |
| 2017/0257886 A1* | 9/2017 | Adjakple | H04L 67/10 |
| 2017/0367036 A1* | 12/2017 | Chen | H04L 43/08 |
| 2019/0014515 A1* | 1/2019 | Zee | H04W 76/27 |
| 2019/0174406 A1* | 6/2019 | Hwang | H04W 36/0066 |
| 2019/0246282 A1* | 8/2019 | Li | H04W 12/106 |
| 2019/0319686 A1* | 10/2019 | Chen, IV | H04W 48/20 |
| 2020/0382189 A1* | 12/2020 | Chen | H04B 7/0617 |
| 2021/0100061 A1* | 4/2021 | Park | H04W 28/0268 |

FOREIGN PATENT DOCUMENTS

| | | |
|---|---|---|
| CN | 106572516 A | 4/2017 |
| CN | 106954267 A | 7/2017 |
| JP | 2011181994 A | 9/2011 |
| KR | 20170026294 A | 3/2017 |
| WO | 2016105570 A1 | 6/2016 |
| WO | 20 17098442 A1 | 6/2017 |
| WO | 2017135684 A1 | 8/2017 |
| WO | 2017140342 A1 | 8/2017 |

OTHER PUBLICATIONS

English translation of China Second OA for application No. 201780057722.2 dated Mar. 2, 2020.
EP Examination for EP application No. 17925428.9 dated Mar. 10, 2020.
Extended European search report issued in corresponding European application No. 17925428.9 dated Oct. 8, 2019.
3GPP TSG-RAN WG1 Meeting #88; R1-1702530 Athens, Greece, Feb. 13-17, 2017.
3GPP TSG-RAN WG2 Meeting NR ad hoc; R2-1706899 Qingdao, China, Jun. 26-30, 2017.
3GPP TSG-RAN WG2 NR #99 Meeting; R2-1708083 Berlin, Germany, Aug. 21-25, 2017.
3GPP TSG-RAN WG2#99; R2-1709331 Berlin, Germany, Aug. 21-25, 2017.
3GPP TSG-RAN WG2 Meeting #98; R2-1704244 Hangzhou, China, May 15-19, 2017, XP051274822.
3GPP TSG-RAN WG2 Meeting #99; R2-1708109 Berlin, Germany, Aug. 21-25, 2017, XP051318012.
3GPP TSG SA Meeting #76; Jun. 7-9, 2017, West Palm Beach, Florida, USA; TD SP-170384.
3GPP TS 23.501 V1.0.0 (Jun. 2017); 3rd Generation Partnership Project; Technical Specification Group Services and System Aspects; System Architecture for the 5G System; Stage 2 (Release 15).
3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
Extended European Search Report for EP Application 20000423.2 dated Apr. 15, 2021. (13 pages).

* cited by examiner

300

A terminal device receives information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state — 310

The terminal device selects a frequency to reside at according to the information of the frequency priority when re-entering the connected state from the idle state or the inactive state — 320

Transmit a first request message to a core network device, wherein the first request message is used for indicating that a terminal device is about to enter an idle state or an inactive state from a connected state and requesting a configuration of information of a frequency priority for the terminal device, and the information of the frequency priority indicates information of an order of frequencies at which the terminal device may reside and which are sorted according to a priority — 410

Receive the information of the frequency priority configured by the core network device — 420

Transmit the information of the frequency priority to the terminal device — 430

| A terminal device receives information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state | ~ 510 |

| The terminal device selects a frequency to reside at according to the information of the frequency priority when re-entering the connected state from the idle state or the inactive state | ~ 520 |

| Receive a first request message transmitted by a base station, wherein the first request message is used for indicating that a terminal device is about to enter an idle state or an inactive state from a connected state and requesting a configuration of information of a frequency priority for the terminal device, and the information of the frequency priority indicates information of an order of frequencies at which the terminal device may reside and which are sorted according to a priority | ~ 610 |

| Configure the information of the frequency priority according to information of a network slice registered by the terminal device and a tracking area identity (TAI) list of the terminal device, wherein a frequency corresponding to the network slice registered by the terminal device is a frequency at which the terminal device preferentially resides | ~ 620 |

| Transmit the configured information of the frequency priority to the base station | ~ 630 |

FIG. 6

METHOD FOR CONFIGURING A FREQUENCY PRIORITY, TERMINAL DEVICE, BASE STATION, AND CORE NETWORK DEVICE

CROSS-REFERENCE TO RELATED APPLICATION(S)

This application is a 371 application of International Application No. PCT/CN2017/101962, filed on Sep. 15, 2017, the entire disclosure of which is hereby incorporated by reference.

TECHNICAL FIELD

The present disclosure relates to the field of communication, and more particularly, to a method for configuring a frequency priority, a terminal device, a base station and a core network device.

BACKGROUND

A Long Term Evolution (LTE) communication system may support a terminal to reselect a cell among cells with different frequencies to realize a function of distributing terminals to reside at different frequency points. The advantage of doing so is that the wireless resources of cells with different frequencies may be reasonably utilized. In particular, a terminal in a connected state may obtain configuration information of frequency priority from a network before releasing the connection to support a cell re-selection with different frequencies after entering an idle state.

In a 5G New Radio (NR) communication system, a network slicing technology is introduced, and different slices may work at different frequencies. If a terminal can reside at a frequency of a slice registered by the terminal and most likely for service transmission, it will be able to prevent the terminal from performing a switching between different frequencies after entering a connected state. And, in a 5G system, a terminal device may be in a connected state, idle state or inactive state, so a cell re-selection with different frequencies may occur on a terminal in an idle state or an inactive state. Therefore, for a cell re-selection with different frequencies, a configuration of frequency priority not only needs to consider a slice registered by a terminal and a slice most likely to initiate a service connection, but also needs to consider a terminal in an inactive state. Therefore, in an existing LTE system, a configuration of frequency priority supporting a cell re-selection with different frequencies cannot meet requirements of the 5G system.

SUMMARY

Implementations of the present disclosure provide a method for configuring a frequency priority, a terminal device, a base station and a core network device. When configuring information of frequency priority, the base station or core network device takes into account frequency information corresponding to network slices registered by the terminal device. Meanwhile, terminal devices in an idle state or an inactive state do not cross a Tracking Area (TA), or a TA list or a Radio Access Network (RAN) Notification Area, unnecessary or redundant access to a connected state to obtain information of frequency priority is avoided, thus saving signaling overhead and energy consumption of the terminal device.

In a first aspect, an implementation of the present disclosure provides a method for configuring a frequency priority, including: transmitting a first request message to a core network device, wherein the first request message is used for requesting information of a network slice registered by a terminal device, and a frequency corresponding to the network slice registered by the terminal device is a frequency at which the terminal device preferentially resides; receiving a response message transmitted by the core network device for the first request message, wherein the response message comprises information of the network slice registered by the terminal device; configuring information of a frequency priority for the terminal device according to the response message, wherein the information of the frequency priority indicates information of an order of frequencies at which the terminal device may reside and which are sorted according to a priority; and transmitting the configured information of the frequency priority to the terminal device.

Optionally, in one implementation of the first aspect, before transmitting the request message to the core network device, the method further includes: determining that the terminal device is about to enter an idle state or an inactive state from a connected state.

Optionally, in one implementation of the first aspect, the configuring information of a frequency priority for the terminal device according to the response message includes: configuring information of a frequency priority in a tracking area (TA), or information of a frequency priority in a TA list, or information of a frequency priority in a radio access network (RAN) Notification Area for the terminal device according to the response message when the terminal device is about to enter an inactive state from a connected state; wherein an effective range of the information of the frequency priority in a TA is within the TA, an effective range of the information of the frequency priority in a TA list is within all TAs in the TA list, and an effective range of the information of the frequency priority in a RAN Notification Area is within the RAN notification area.

Optionally, in one implementation of the first aspect, the response message further includes a tracking area identity (TAI) list for the terminal device, and the TAI list includes information of all TAs of the terminal device; and the configuring the information of the frequency priority for the terminal device according to the response message includes: configuring information of a frequency priority in a TA, or information of a frequency priority in a TA list according to information of a network slice registered by the terminal device and the TAI list when the terminal device is about to enter an idle state from a connected state; wherein an effective range of the information of the frequency priority in a TA is within the TA, and an effective range of the information of the frequency priority in a TA list is within all TAs in the TA list.

Optionally, in one implementation of the first aspect, the configuring information of a frequency priority in a TA, or information of a frequency priority in a TA list according to information of a network slice registered by the terminal device and the TAI list includes: configuring information of a frequency priority in a TA for the terminal device if the TAI list includes one TA for the terminal device; or configuring information of a frequency priority in a TA list for the terminal device if the TAI list includes a plurality of TAs for the terminal device.

Optionally, in one implementation of the first aspect, the method further includes: transmitting an effective range of the information of the frequency priority to the terminal device.

Optionally, in one implementation of the first aspect, the transmitting the configured information of the frequency priority to the terminal device includes: transmitting the configured information of the frequency priority to the terminal device through a radio resource control (RRC) signaling.

Optionally, in one implementation of the first aspect, the method further includes: receiving a second request message transmitted by the terminal device, wherein the second request message is used for requesting reconfiguration of the information of the frequency priority; and reconfiguring the information of the frequency priority according to the second request message.

Optionally, the core network device may be an access and mobility management function (AMF) or an authentication server function (AUSF).

In a second aspect, the implementation of the present disclosure provides a method for configuring a frequency priority, including: receiving, by a terminal device, information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state; and selecting, by the terminal device, a frequency to reside at according to the information of the frequency priority when re-entering the connected state from the idle state or the inactive state.

Further, according to information of a frequency priority, a terminal device may effectively select a frequency to reside at when re-entering a connected state from an idle state or an inactive state.

Optionally, in one implementation of the second aspect, when an idle state is about to be entered from a connected state, the information of the frequency priority includes information of a frequency priority in a TA or information of a frequency priority in a TA list; or if an inactive state is about to be entered from a connected state, the information of the frequency priority includes information of a frequency priority in a TA, or information of a frequency priority in a TA list, or information of a frequency priority in a radio access network (RAN) notification area.

Optionally, in one implementation of the second aspect, the method further includes: receiving, by the terminal device, an effective range of the information of the frequency priority transmitted by the base station, wherein an effective range of the information of the frequency priority in a TA is within the TA, an effective range of the information of the frequency priority in a TA list is within all TAs in the TA list, and an effective range of the information of the frequency priority in a radio access network (RAN) Notification Area is within the RAN notification area.

Optionally, in one implementation of the second aspect, the method further includes: transmitting, by the terminal device, a request message to the base station if the information of the frequency priority is information of a frequency priority in a TA and the terminal device determines to cross the TA when re-entering a connected state, wherein the request message is used for requesting the base station to reconfigure the information of the frequency priority; or transmitting, by the terminal device, a request message to the base station if the information of the frequency priority is information of a frequency priority in a TA list and the terminal device determines to cross the TA list when re-entering a connected state, wherein the request message is used for requesting the base station to reconfigure the information of the frequency priority; or transmitting, by the terminal device, a request message to the base station if the information of the frequency priority is information of a frequency priority in a RAN Notification Area and the terminal device is not in the RAN Notification Area when determining to re-enter a connected state, wherein the request message is used for requesting the base station to reconfigure the information of the frequency priority.

In a third aspect, the implementation of the present disclosure provides a method for configuring a frequency priority, including: transmitting a first request message to a core network device, wherein the first request message is used for indicating that a terminal device is about to enter an idle state or an inactive state from a connected state and requesting a configuration of information of a frequency priority for the terminal device, and the information of the frequency priority indicates information of an order of frequencies at which the terminal device may reside and which are sorted according to a priority; receiving the information of the frequency priority configured by the core network device; and transmitting the information of the frequency priority to the terminal device.

Optionally, in one implementation of the third aspect, the information of the frequency priority includes information of a frequency priority in a tracking area (TA) or information of a frequency priority in a TA list, wherein an effective range of information of a frequency priority in a TA is within the TA, and an effective range of information of a frequency priority in a TA list is within all TAs in the TA list.

Optionally, in one implementation of the third aspect, the method further includes: transmitting an effective range of the information of the frequency priority to the terminal device.

Optionally, in an implementation of the third aspect, the receiving the information of the frequency priority configured by the core network device includes: receiving a non-access stratum (NAS) message transmitted by the core network device, wherein the NAS message includes the information of the frequency priority configured by the core network device.

Optionally, in an implementation of the third aspect, the transmitting the information of the frequency priority to the terminal device includes: forwarding the NAS message to the terminal device.

Optionally, in an implementation of the third aspect, the transmitting the information of the frequency priority to the terminal device includes: transmitting a radio resource control (RRC) signaling to the terminal device, wherein the RRC signaling includes the information of the frequency priority.

Optionally, in one implementation of the third aspect, the method further includes: receiving a second request message transmitted by the terminal device, wherein the second request message is used for requesting reconfiguration of the information of the frequency priority; and transmitting a third request message to the core network device according to the second request message, wherein the third request message is used for requesting the core network device to reconfigure the information of the frequency priority.

Optionally, the core network device may be an access and mobility management function (AMF) or an authentication server function (AUSF).

In the fourth aspect, the implementation of the present disclosure provides a method for configuring a frequency priority, including: receiving, by a terminal device, information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state; and selecting, by the terminal device, a frequency to reside at according to the information of the frequency priority when re-entering the connected state from the idle state or the inactive state.

Further, a terminal device may effectively select a frequency to reside at when re-entering a connected state from an idle state or an inactive state according to information of a frequency priority.

Optionally, in one implementation of the fourth aspect, the information of the frequency priority includes information of a frequency priority in a tracking area (TA) or information of a frequency priority in a TA list.

Optionally, in one implementation of the fourth aspect, the method further includes: receiving, by the terminal device, an effective range of the information of the frequency priority transmitted by the base station, wherein an effective range of the information of the frequency priority in a TA is within the TA, an effective range of the information of the frequency priority in a TA list is within all TAs in the TA list.

Optionally, in one implementation of the fourth aspect, the method further includes: transmitting, by the terminal device, a request message to the base station if the information of the frequency priority is the information of the frequency priority in a TA and the terminal device determines to cross the TA when re-entering the connected state, wherein the request message is used for requesting reconfiguration of the information of the frequency priority; or transmitting, by the terminal device, a request message to the base station if the information of the frequency priority is the information of the frequency priority in a TA list and the terminal device determines to cross the TA list when re-entering the connected state, wherein the request message is used for requesting reconfiguration of the information of the frequency priority.

In a fifth aspect, the implementation of the present disclosure provides a method for configuring a frequency priority, including: receiving a first request message transmitted by a base station, wherein the first request message is used for indicating that a terminal device is about to enter an idle state or an inactive state from a connected state and requesting a configuration of information of a frequency priority for the terminal device, and the information of the frequency priority indicates information of an order of frequencies at which the terminal device may reside and which are sorted according to a priority; configuring the information of the frequency priority according to information of a network slice registered by the terminal device and a tracking area identity (TAI) list of the terminal device, wherein a frequency corresponding to the network slice registered by the terminal device is a frequency at which the terminal device preferentially resides; and transmitting the configured information of the frequency priority to the base station.

Optionally, the method may be performed by a 5G core network, specifically, an access and mobility management function (AMF) or an authentication server function (AUSF) in the 5G core network.

Optionally, in an implementation of the fifth aspect, the configuring the information of the frequency priority according to the information of the network slice registered by the terminal device and the TAI list of the terminal device includes: configuring information of a frequency priority in a TA for the terminal device if the TAI list includes one TA for the terminal device; or configuring information of a frequency priority in a TA list for the terminal device if the TAI list includes a plurality of TAs for the terminal device; wherein an effective range of the information of the frequency priority in a TA is within the TA, an effective range of the information of the frequency priority in a TA list is within all TAs in the TA list.

Optionally, in one implementation of the fifth aspect, the method further includes: transmitting an effective range of the configured information of the frequency priority to the base station.

Optionally, in an implementation of the fifth aspect, the transmitting the configured information of the frequency priority to the base station includes: transmitting a non-access stratum (NAS) message to the base station, wherein the NAS message includes the information of the frequency priority.

Optionally, in one implementation of the fifth aspect, the method further includes: receiving a second request message transmitted by the base station, wherein the second request message is used for requesting reconfiguration of the information of the frequency priority for the terminal device; and reconfiguring the information of the frequency priority according to the second request message.

In a sixth aspect, the implementation of the present disclosure provides a base station, which may execute a module or unit of the method in the first aspect or any alternative implementation of the first aspect.

In a seventh aspect, the implementation of the present disclosure provides a terminal device that may execute a module or unit of the method in the second aspect or any alternative implementation of the second aspect.

In an eighth aspect, the implementation of the present disclosure provides a base station, which may execute a module or unit of the method in the third aspect or any alternative implementation of the third aspect.

In a ninth aspect, the implementation of the present disclosure provides a terminal device that may execute a module or unit of the method in the fourth aspect or any alternative implementation of the fourth aspect.

In a tenth aspect, the implementation of the present disclosure provides a core network device, which may execute a module or unit of the method in the fifth aspect or any alternative implementation of the fifth aspect.

In an eleventh aspect, a base station is provided, and the base station includes a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to execute the method in the first aspect or any possible implementation of the first aspect.

In a twelfth aspect, a terminal device is provided, and the terminal device includes a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to execute the method in the second aspect or any possible implementation of the second aspect.

In a thirteenth aspect, a base station is provided, and the base station includes a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to execute the method in the third aspect or any possible implementation of the third aspect.

In a fourteenth aspect, a terminal device is provided, and the terminal device includes a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to execute the method in the fourth aspect or any possible implementation of the fourth aspect.

In a fifteenth aspect, a core network device is provided, and the core network device includes a processor, a memory, and a communication interface. The processor is connected with the memory and the communication interface. The memory is used for storing instructions, and the processor is used for executing the instructions, and the communication interface is used for communicating with other network elements under the control of the processor. When the processor executes instructions stored in the memory, the execution causes the processor to execute the method in the fifth aspect or any possible implementation of the fifth aspect.

In a sixteenth aspect, a computer storage medium is provided, and the computer storage medium has stored program codes for instructing a computer to execute instructions of a method in the first aspect or any possible implementation of the first aspect.

In a seventeenth aspect, a computer storage medium is provided, and the computer storage medium has stored program codes for instructing a computer to execute instructions of a method in the second aspect or any possible implementation of the second aspect.

In an eighteenth aspect, a computer storage medium is provided, and the computer storage medium has stored program codes for instructing a computer to execute instructions of a method in the third aspect or any possible implementation of the third aspect.

In a nineteenth aspect, a computer storage medium is provided, and the computer storage medium has stored program codes for instructing a computer to execute instructions of a method in the fourth aspect or any possible implementation of the fourth aspect.

In a twentieth aspect, a computer storage medium is provided, and the computer storage medium has stored program codes for instructing a computer to execute instructions of a method in the fifth aspect or any possible implementation of the fifth aspect.

In a twenty-first aspect, a computer program product including instructions is provided, when executed on a computer, the instructions cause the computer to perform the methods described in the above aspects.

BRIEF DESCRIPTION OF DRAWINGS

FIG. 3 is a schematic flowchart of another method for configuring a frequency priority according to an implementation of the present disclosure.

FIG. 4 is a schematic flowchart of yet another method for configuring a frequency priority according to an implementation of the present disclosure.

FIG. 5 is a schematic flowchart of yet another method for configuring a frequency priority according to an implementation of the present disclosure.

FIG. 6 is a schematic flowchart of yet another method for configuring a frequency priority according to an implementation of the present disclosure.

DETAILED DESCRIPTION

Technical schemes in implementations of the present disclosure will be clearly and completely described below with reference to the drawings of the implementations of the present disclosure.

The technical schemes of the implementations of the present disclosure may be applied to a 5G NR communication system.

Figure 1:
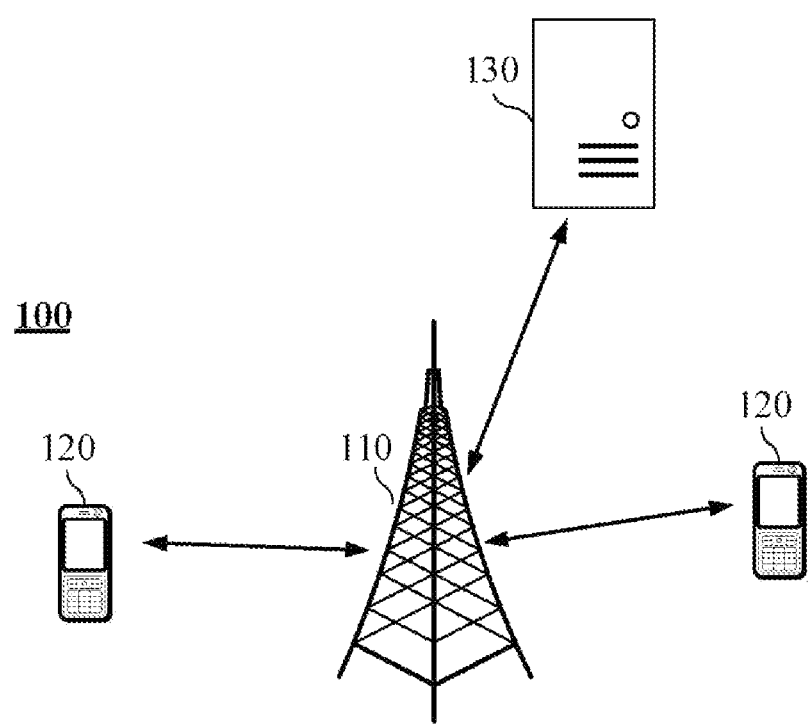
FIG. 1 shows a wireless communication system to which implementations of the present disclosure are applied.

FIG. 1 shows a wireless communication system 100 to which the implementations of the present disclosure may be applied. The wireless communication system 100 may include a base station 110. The base station 110 may be a device that communicates with a terminal device. The base station 110 may provide a communication coverage for a specific geographic area and may communicate with the terminal device (e.g., UE) located within the coverage area.

Optionally, the base station 110 may be a base station (gNB) in an NR system, or a radio controller in a Cloud Radio Access Network (CRAN), or the network device may be a relay station, an access point, an on-board device, a wearable device, or a network device in a Public Land Mobile Network (PLMN) to be evolved in the future, etc.

The wireless communication system 100 also includes at least one terminal device 120 located within a coverage range of the base station 110. The terminal device 120 may be mobile or fixed. Optionally, the terminal device 120 may refers to an access terminal, User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, an on-board device, a wearable device, a terminal device in a future 5G network, or a terminal device in a future evolved Public Land Mobile Network (PLMN), or the like.

The wireless communication system 100 further includes a core network device 130 that communicates with a base station. The core network device 130 may be a 5G core network device, for example, an Access and Mobility Management Function (AMF) or an Authentication Server Function (AUSF).

Optionally, in the implementation of the present disclosure, AMF may carry out information interaction with AUSF, for example, AMF obtains registration information of some terminal devices from AUSF.

Optionally, in the implementation of the present disclosure, AMF may obtain information of a network slice of the terminal device from AUSF.

FIG. 1 exemplifies a base station, a core network device and two terminal devices. Optionally, the wireless communication system 100 may include a plurality of base station devices and other quantity of terminal devices may be included in a coverage range of each base station, which is not limited by the implementation of the present disclosure.

Optionally, the wireless communication system 100 may also include other network entities, such as Session Management Function (SMF), Unified Data Management (UDM), or Authentication Server Function (AUSF), which is not limited by the implementation of the present disclosure.

It should be understood that the terms "system" and "network" are often used interchangeably herein. The term "and/or" in this document is merely an association relationship describing an associated object, indicating that there may be three relationships, for example, a and/or b may indicate three situations: a alone, a and b, and b alone. In addition, the symbol "/" in this document generally indicates that objects of the former and the latter connected by "/" has an "or" relationship.

Figure 2:
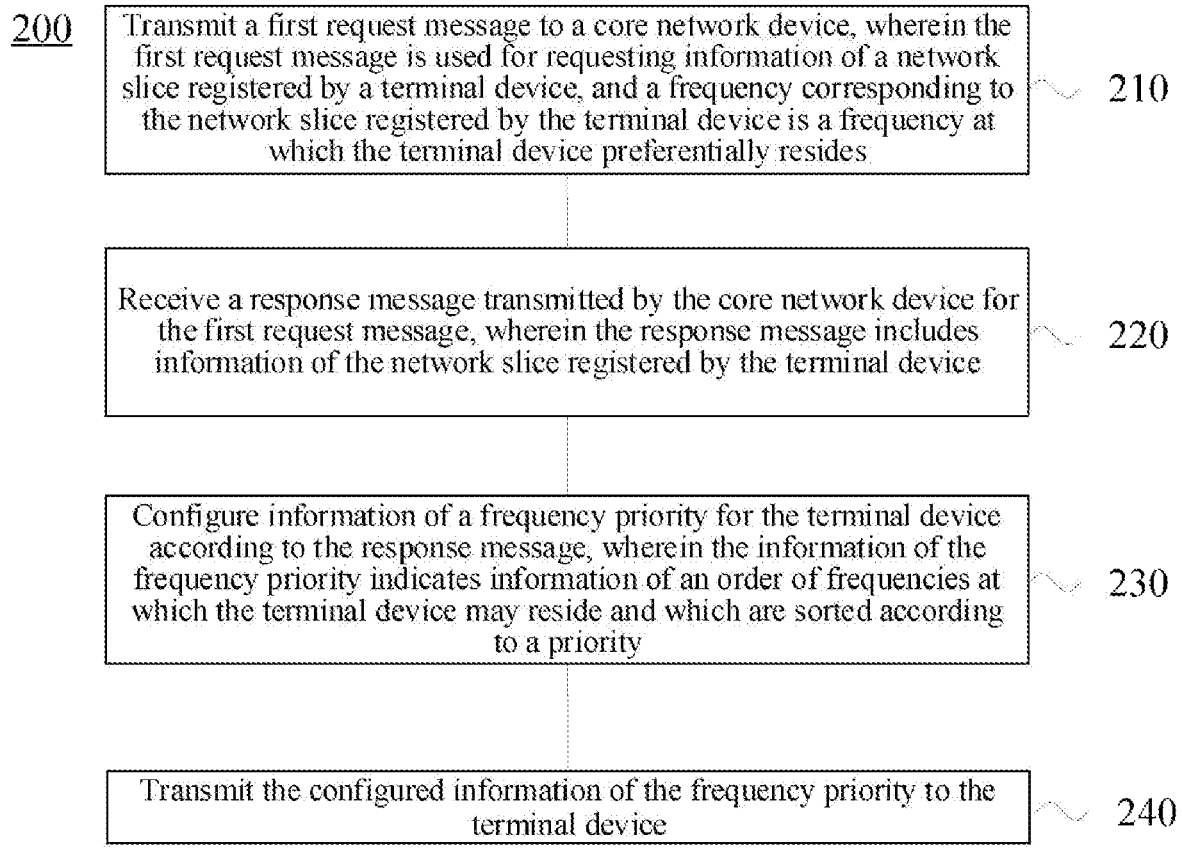
FIG. 2 is a schematic flowchart of a method for configuring a frequency priority according to an implementation of the present disclosure.

FIG. 2 is a schematic flowchart of a method 200 for configuring a frequency priority according to an implementation of the present disclosure. As shown in FIG. 2, the method 200 may be performed by a base station, which may be the base station as shown in FIG. 1, and a terminal device and a core network device (e.g., AMF or AUSF in 5G core network) in the method 200 may be the terminal device and the core network device as shown in FIG. 1, and the method 200 includes the following contents.

In 210, a first request message is transmitted to a core network device, wherein the first request message is used for requesting information of a network slice registered by a terminal device, and a frequency corresponding to the network slice registered by the terminal device is a frequency at which the terminal device preferentially resides.

Optionally, a base station determines that the terminal device is about to enter an idle state or an inactive state from a connected state before transmitting the request message to the core network device.

Optionally, when the terminal device is about to enter an idle state or an inactive state, it reports to a base station that it is about to enter an idle state or an inactive state.

Optionally, a base station determines that a terminal device is in a connected state and is about to enter an idle state or an inactive state.

Optionally, the inactive state is between a connected state and an idle state. In the inactive state, a terminal device has no connection with an access network device, but maintains a connection with a core network device, and the terminal device stores all or part of the information necessary for establishing/restoring a connection. Therefore, in the inactive state, when the terminal device needs to establish a connection, it may quickly establish/restore an RRC connection with the network according to the stored relevant information.

Optionally, the frequency corresponding to the network slice registered by the terminal device is a frequency at which the terminal device preferentially resides.

Optionally, a core network device and a Non-Access Stratum (NAS) can recognize different network slices, that is, the information of the network slice registered by the terminal device is stored on a core network side.

In 220, a response message transmitted by the core network device for the first request message is received, wherein the response message includes information of the network slice registered by the terminal device.

Optionally, a core network device may also feedback to a base station a tracking area identity (TAI) list for the terminal device, which includes information of all TAs of the terminal device.

Optionally, a role of a TA: when a terminal device is in an idle state or an inactive state, a core network may know a tracking area where the terminal device is located, and when the terminal device in the idle state or inactive state needs to be paged, paging must be performed in all cells of the tracking area registered by the terminal device.

Optionally, one TA list is composed of a plurality of TAs which are assigned to one terminal device at the same time. When the terminal device moves within the TA list, updating a TA is not required, thus reducing frequent interaction with a network.

Optionally, when a terminal device enters a new TA area that is not in its registered TA list, updating a TA needs to be performed, and AMF reallocates a group of TAs to the terminal device, and the newly allocated TAs may also include some TAs in the original TA list.

Optionally, a TA is a cell-level configuration, multiple cells may be configured with the same TA, and one cell may only belong to one TA.

Optionally, different network slices may operate at different frequencies.

Optionally, if a terminal device may reside at a frequency of a network slice registered by the terminal device and most likely to carry out a transmission of services, it will be able to prevent the terminal from performing an inter-frequency switching after entering a connected state.

In 230, information of a frequency priority for the terminal device is configured according to the response message, wherein the information of the frequency priority indicates information of an order of frequencies at which the terminal device may reside and which are sorted according to a priority.

Optionally, when the terminal device is about to enter an inactive state from a connected state, information of a frequency priority in a tracking area (TA), or information of a frequency priority in a TA list, or information of a frequency priority in a radio access network (RAN) Notification Area for the terminal device is configured according to the response message; wherein an effective range of the information of the frequency priority in a TA is within the TA, an effective range of the information of the frequency priority in a TA list is within all TAs in the TA list, and an effective range of the information of the frequency priority in a RAN Notification Area is within the RAN notification area.

Optionally, when the terminal device is about to enter an idle state from a connected state, information of a frequency priority in a TA, or information of a frequency priority in a TA list is configured for the terminal device according to the information of the network slice registered by the terminal device and the TAI list; wherein an effective range of the information of the frequency priority in a TA is within the TA, and an effective range of the information of the frequency priority in a TA list is within all TAs in the TA list.

Optionally, if the TAI list includes one TA for the terminal device, information of a frequency priority in the TA for the terminal device is configured.

Optionally, if the TAI list includes a plurality of TAs for the terminal device, information of a frequency priority in a TA list for the terminal device is configured.

In 240, the configured information of the frequency priority is transmitted to the terminal device.

Optionally, when a base station transmits the configured information of the frequency priority to the terminal device, the base station transmits an effective range of the information of the frequency priority to the terminal device.

Optionally, a base station transmits the configured information of the frequency priority to the terminal device through a radio resource control (RRC) signaling.

Optionally, the method 200 further includes: receiving a second request message transmitted by the terminal device, wherein the second request message is used for requesting reconfiguration of the information of the frequency priority; and reconfiguring the information of the frequency priority according to the second request message.

Optionally, a terminal device in an idle state or an inactive state decides whether to re-acquire a frequency priority from a network side when crossing a TA or a TA list or leaving a RAN range according to an effective range of information of a frequency priority.

Optionally, when a terminal device needs to re-acquire a frequency priority from a network side, the terminal device needs to re-enter a connected state, and at this time, a base station may reconfigure information of a frequency priority according to the latest state of the terminal device.

Therefore, in the method for configuring the frequency priority according to the implementation of the present disclosure, when a base station configures the information of the frequency priority for a terminal device, information of a network slice registered by a terminal device is considered, so that a frequency at which the terminal device may reside may be known effectively, and thereby information of a frequency priority may be configured more effectively.

Further, a base station configures information of a frequency priority in a TA, or information of a frequency priority in a TA list, or information of a frequency priority in a radio access network (RAN) Notification Area when a terminal device is about to enter an inactive state from a connected state. When the terminal device in the inactive state does not cross the TA or TA list or RAN notification area, unnecessary or redundant entry into the connected state to acquire information of a frequency priority is avoided, thereby saving signaling overhead and energy consumption of the terminal device.

FIG. 3 is a schematic flowchart of a method 300 for configuring a frequency priority according to an implementation of the present disclosure. As shown in FIG. 3, the method 300 may be performed by a terminal device, which may be the terminal device as shown in FIG. 1, and a base station in the method 300 may be the base station as shown in FIG. 1. The method 300 includes the following contents.

In 310, a terminal device receives information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state.

In 320, the terminal device selects a frequency to reside at according to the information of the frequency priority when re-entering the connected state from the idle state or the inactive state.

Optionally, when an idle state is about to be entered from a connected state, the information of the frequency priority includes information of a frequency priority in a TA or information of a frequency priority in a TA list; or if an inactive state is about to be entered from a connected state, the information of the frequency priority includes information of a frequency priority in a TA, or information of a frequency priority in a TA list, or information of a frequency priority in a radio access network (RAN) notification area.

Optionally, the method 300 further includes: receiving, by the terminal device, an effective range of the information of the frequency priority transmitted by the base station, wherein an effective range of the information of the frequency priority in a TA is within the TA, an effective range of the information of the frequency priority in a TA list is within all TAs in the TA list, and an effective range of the information of the frequency priority in a radio access network (RAN) Notification Area is within the RAN notification area.

Optionally, the method 300 further includes: if the information of the frequency priority is information of a frequency priority in a TA and the terminal device determines to cross the TA when re-entering a connected state, transmitting, by the terminal device, a request message to the base station, wherein the request message is used for requesting the base station to reconfigure the information of the frequency priority; or if the information of the frequency priority is information of a frequency priority in a TA list and the terminal device determines to cross the TA list when re-entering a connected state, transmitting, by the terminal device, a request message to the base station, wherein the request message is used for requesting the base station to reconfigure the information of the frequency priority; or if the information of the frequency priority is information of a frequency priority in a RAN Notification Area and the terminal device is not in the RAN Notification Area when determining to re-enter a connected state, transmitting, by the terminal device, a request message to the base station, wherein the request message is used for requesting the base station to reconfigure the information of the frequency priority.

It should be understood that the acts in the method 300 for configuring the frequency priority may refer to the description of corresponding acts in the method 200 for configuring the frequency priority, and will not be repeated here for the sake of brevity.

Therefore, in the method for configuring the frequency priority according to the implementation of the present disclosure, when the base station configures the information of the frequency priority for the terminal device, the information of the network slice registered by the terminal device is considered, so that the frequency where the terminal device may reside may be effectively known, and thereby the information of the frequency priority may be configured more effectively.

Further, the base station configures information of a frequency priority in a TA, or information of a frequency priority in a TA list, or information of a frequency priority in a radio access network (RAN) Notification Area when the terminal device is about to enter the inactive state from the connected state. When the terminal device in the inactive state does not cross the TA or TA list or RAN notification area, unnecessary or redundant entry into the connected state to acquire information of a frequency priority is avoided, thereby saving signaling overhead and energy consumption of the terminal device.

FIG. 4 is a schematic flowchart of a method 400 for configuring a frequency priority according to an implementation of the present disclosure. As shown in FIG. 4, the method 400 may be performed by a base station, which may be the base station as shown in FIG. 1, and a terminal device and a core network device (e.g., AMF or AUSF in 5G core network) in the method 400 may be the terminal device and the core network device as shown in FIG. 1, and the method 400 includes the following contents.

In 410, a first request message is transmitted to a core network device, wherein the first request message is used for indicating that a terminal device is about to enter an idle state or an inactive state from a connected state and requesting a configuration of information of a frequency priority for the terminal device, and the information of the frequency priority indicates information of an order of frequencies at which the terminal device may reside and which are sorted according to a priority.

In 420, the information of the frequency priority configured by the core network device is received.

Optionally, the information of the frequency priority includes information of a frequency priority in a TA or information of a frequency priority in a TA list, wherein an effective range of the information of the frequency priority in a TA is within the TA, and an effective range of the information of the frequency priority in a TA list is within all TAs in the TA list.

In 430, the information of the frequency priority is transmitted to the terminal device.

Optionally, the method 400 further includes: transmitting the effective range of the information of the frequency priority to the terminal device.

Optionally, the receiving the information of the frequency priority configured by the core network device includes: receiving a non-access stratum (NAS) message transmitted by the core network device, wherein the NAS message includes the information of the frequency priority configured by the core network device.

Optionally, the transmitting the information of the frequency priority to the terminal device includes: forwarding the NAS message to the terminal device.

Optionally, the transmitting the information of the frequency priority to the terminal device includes: transmitting a RRC signaling to the terminal device, wherein the RRC signaling includes the information of the frequency priority.

Optionally, the method 400 further includes: receiving a second request message transmitted by the terminal device, wherein the second request message is used for requesting reconfiguration of the information of the frequency priority; and transmitting a third request message to the core network device according to the second request message, wherein the third request message is used for requesting the core network device to reconfigure the information of the frequency priority.

It should be understood that the acts in the method 400 for configuring the frequency priority may refer to the description of corresponding acts in the method 200 for configuring the frequency priority, and will not be repeated here for the sake of brevity.

Therefore, in the method for configuring the frequency priority according to the implementation of the present disclosure, a base station transmits a request message to a core network device so that when configuring information of a frequency priority for a terminal device, the core network device considers a state that the terminal device is about to enter from a connected state, thus, a frequency at which the terminal device may reside may be effectively known, and thereby the information of the frequency priority may be configured more effectively.

Further, a core network device configures information of a frequency priority in a TA or information of a frequency priority in a TA list when the terminal device is about to enter an idle state from a connected state. When the terminal device in the idle state does not cross the TA or the TA list, unnecessary or redundant entry into the connected state to acquire the information of the frequency priority is avoided, thereby saving signaling overhead and energy consumption of the terminal device.

FIG. 5 is a schematic flowchart of a method 500 for configuring a frequency priority according to an implementation of the present disclosure. As shown in FIG. 5, the method 500 may be performed by a terminal device, which may be the terminal device as shown in FIG. 1, and a base station in the method 500 may be the base station as shown in FIG. 1. The method 500 includes the following contents.

In 510, a terminal device receives information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state.

In 520, the terminal device selects a frequency to reside at according to the information of the frequency priority when re-entering the connected state from the idle state or the inactive state.

Optionally, the information of the frequency priority includes information of a frequency priority in a tracking area (TA) or information of a frequency priority in a TA list.

Optionally, the method 500 further includes: receiving, by the terminal device, an effective range of the information of the frequency priority transmitted by the base station, wherein an effective range of the information of the frequency priority in a TA is within the TA, an effective range of the information of the frequency priority in a TA list is within all TAs in the TA list.

Optionally, the method 500 further includes: if the information of the frequency priority is information of a frequency priority in a TA and the terminal device determines to cross the TA when re-entering a connected state, transmitting, by the terminal device, a request message to the base station, wherein the request message is used for requesting reconfiguration of the information of the frequency priority; or if the information of the frequency priority is information of a frequency priority in a TA list and the terminal device determines to cross the TA list when re-entering a connected state, transmitting, by the terminal device, a request message to the base station, wherein the request message is used for requesting reconfiguration of the information of the frequency priority.

It should be understood that the acts in the method 500 for configuring the frequency priority may refer to the description of corresponding acts in the method 200 for configuring the frequency priority, and will not be repeated here for the sake of brevity.

Therefore, in the method for configuring the frequency priority according to the implementation of the present disclosure, a base station transmits a request message to a core network device so that when configuring information of a frequency priority for a terminal device, the core network device considers a state that the terminal device is about to enter from a connected state, thus, a frequency at which the terminal device may reside may be effectively known, and thereby the information of the frequency priority may be configured more effectively.

Further, a core network device configures information of a frequency priority in a TA or information of a frequency priority in a TA list when the terminal device is about to enter an idle state from a connected state. When the terminal device in the idle state does not cross the TA or the TA list, unnecessary or redundant entry into the connected state to acquire the information of the frequency priority is avoided, thereby saving signaling overhead and energy consumption of the terminal device.

FIG. 6 is a schematic flowchart of a method 600 for configuring a frequency priority according to an implementation of the present disclosure. As shown in FIG. 6, the method 600 may be performed by a core network device (e.g., AMF or AUSF in a 5G core network), which may be the core network device as shown in FIG. 1, and a terminal device and a base station in the method 600 may be the terminal device and the base station as shown in FIG. 1. The method 600 includes the following contents.

In 610, a first request message transmitted by a base station is received, wherein the first request message is used for indicating that a terminal device is about to enter an idle state or an inactive state from a connected state and requesting a configuration of information of a frequency priority for the terminal device, and the information of the frequency priority indicates information of an order of frequencies at which the terminal device may reside and which are sorted according to a priority.

In 620, the information of the frequency priority is configured according to information of a network slice registered by the terminal device and a tracking area identity (TAI) list of the terminal device, wherein a frequency corresponding to the network slice registered by the terminal device is a frequency at which the terminal device preferentially resides.

In 630, the configured information of the frequency priority is transmitted to the base station.

Optionally, the configuring the information of the frequency priority according to the information of the network slice registered by the terminal device and the TAI list of the terminal device includes: configuring information of a frequency priority in a TA for the terminal device if the TAI list includes one TA for the terminal device; or configuring information of a frequency priority in a TA list for the terminal device if the TAI list includes a plurality of TAs for the terminal device; wherein an effective range of the information of the frequency priority in a TA is within the TA, an effective range of the information of the frequency priority in a TA list is within all TAs in the TA list.

Optionally, the method further includes: transmitting the effective range of the configured information of the frequency priority to the base station.

Optionally, the transmitting the configured information of the frequency priority to the base station includes: transmitting a non-access stratum (NAS) message to the base station, wherein the NAS message includes the information of the frequency priority.

Optionally, the method further includes: receiving a second request message transmitted by the base station, wherein the second request message is used for requesting reconfiguration of the information of the frequency priority for the terminal device; and reconfiguring the information of the frequency priority according to the second request message.

It should be understood that the acts in the method 600 for configuring the frequency priority may refer to the description of corresponding acts in the method 200 for configuring the frequency priority, and will not be repeated here for the sake of brevity.

Therefore, in the method for configuring the frequency priority according to the implementation of the present disclosure, a base station transmits a request message to a core network device so that when configuring information of a frequency priority for a terminal device, the core network device considers a state that the terminal device is about to enter from a connected state, thus, a frequency at which the terminal device may reside may be effectively known, and thereby the information of the frequency priority may be configured more effectively.

Further, a core network device configures information of a frequency priority in a TA or information of a frequency priority in a TA list when the terminal device is about to enter an idle state from a connected state. When the terminal device in the idle state does not cross the TA or the TA list, unnecessary or redundant entry into the connected state to acquire the information of the frequency priority is avoided, thereby saving signaling overhead and energy consumption of the terminal device.

Figure 7:
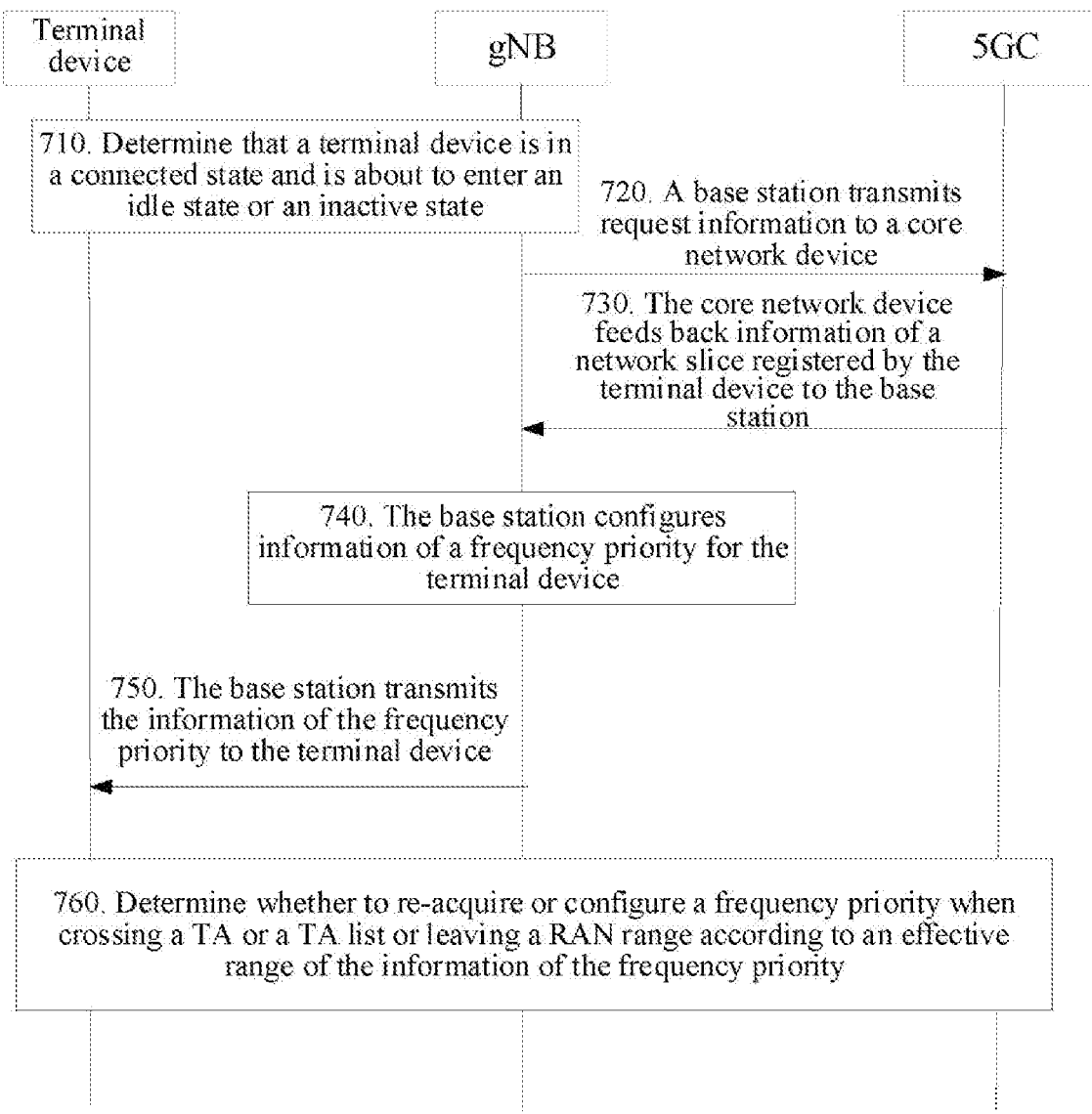
FIG. 7 is a schematic flowchart of a method for configuring a frequency priority according to one implementation of the present disclosure.

As one implementation, as shown in FIG. 7, a frequency priority may be configured by information interaction between a terminal device (e.g., UE), a base station (e.g., gNB) and a core network device (e.g., AMF or AUSF in a 5G core network).

In 710, it is determined that a terminal device is in a connected state and is about to enter an idle state or an inactive state.

Optionally, the inactive state is between a connected state and an idle state. In the inactive state, a terminal device has no connection with an access network device, but maintains a connection with a core network device, and the terminal device stores all or part of the information necessary for establishing/restoring a connection. Therefore, in the inactive state, when the terminal device needs to establish a connection, it may quickly establish/restore an RRC connection with the network according to the stored relevant information.

Optionally, when the terminal device is about to enter an idle state or an inactive state, it reports to a base station that it is about to enter an idle state or an inactive state.

Optionally, a base station determines that a terminal device is in a connected state and is about to enter an idle state or an inactive state.

In 720, a base station transmits request information to a core network device.

Optionally, information of a network slice registered by a terminal device is requested.

Optionally, the frequency corresponding to the network slice registered by the terminal device is a frequency at which the terminal device preferentially resides.

Optionally, a core network device and a Non-Access Stratum (NAS) may recognize different network slices, that is, information of a network slice registered by the terminal device is stored on a core network side.

In 730, the core network device feeds back information of a network slice registered by the terminal device to the base station.

Optionally, a core network device may also feedback to a base station a tracking area identity (TAI) list for the terminal device, which includes information of all TAs of the terminal device.

In 740, the base station configures information of a frequency priority for the terminal device.

Optionally, the information of the frequency priority indicates information of an order of frequencies at which the terminal device may reside and which are sorted according to a priority.

Optionally, when the terminal device is about to enter an inactive state from a connected state, information of a frequency priority in a tracking area (TA), or information of a frequency priority in a TA list, or information of a frequency priority in a radio access network (RAN) Notification Area is configured for the terminal device according to the response message; wherein an effective range of the information of the frequency priority in a TA is within the TA, an effective range of the information of the frequency priority in a TA list is within all TAs in the TA list, and an effective range of the information of the frequency priority in a RAN Notification Area is within the RAN notification area.

Optionally, when the terminal device is about to enter an idle state from a connected state, information of a frequency priority in a TA, or information of a frequency priority in a TA list is configured according to the information of a network slice registered by the terminal device and the TAI list; wherein an effective range of the information of the frequency priority in a TA is within the TA, and an effective range of the information of the frequency priority in a TA list is within all TAs in the TA list.

Optionally, if the TAI list includes one TA for the terminal device, information of a frequency priority in the TA for the terminal device is configured.

Optionally, if the TAI list includes a plurality of TAs for the terminal device, information of a frequency priority in a TA list for the terminal device is configured.

In 750, the base station transmits the information of the frequency priority to the terminal device.

Optionally, a base station may transmit information of a frequency priority to a terminal device through a RRC signaling.

Optionally, a base station indicates an effective range of information of a frequency priority when transmitting the information of the frequency priority.

In 760, it is determined whether to re-acquire or configure a frequency priority when the terminal device is crossing a TA or a TA list or leaving a RAN range according to an effective range of the information of the frequency priority.

Optionally, a terminal device in an idle state or an inactive state determines whether to re-acquire a frequency priority from a network side when entering a connected state, and when crossing a TA or a TA list or leaving a RAN range.

Optionally, a base station determines whether to reconfigure a frequency priority when a terminal device crosses a TA or a TA list or leaves a RAN range.

Optionally, a core network device determines whether to reconfigure a frequency priority when a terminal device crosses a TA or a TA list or leaves a RAN range.

Optionally, when a terminal device needs to re-acquire a frequency priority from a network side, the terminal device needs to re-enter a connected state, and at this time, a base station may reconfigure information of a frequency priority according to a latest state of the terminal device.

Therefore, in the method for configuring the frequency priority according to the implementation of the present disclosure, when the base station configures the information of the frequency priority for the terminal device, the information of the network slice registered by the terminal device is considered, so that the frequency where the terminal device may reside may be effectively known, and thereby the information of the frequency priority may be configured more effectively.

Further, a base station configures information of a frequency priority in a TA, or information of a frequency priority in a TA list, or information of a frequency priority in a radio access network (RAN) Notification Area when a terminal device is about to enter an inactive state from a connected state. When the terminal device in the inactive state does not cross the TA or TA list or RAN notification area, unnecessary or redundant entry into the connected state to acquire information of a frequency priority is avoided, thereby saving signaling overhead and energy consumption of the terminal device.

Figure 8:
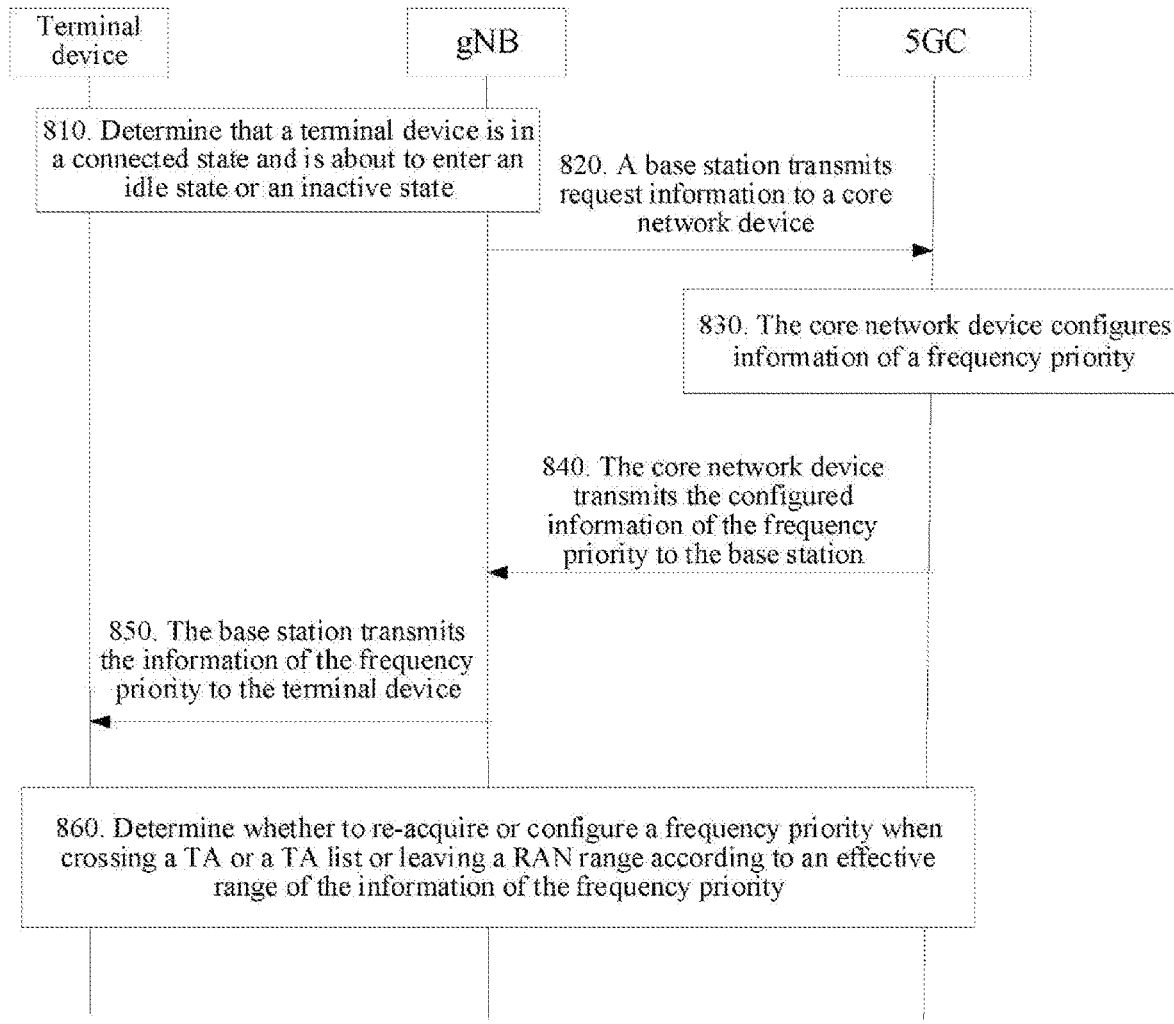
FIG. 8 is a schematic flowchart of a method for configuring a frequency priority according to another implementation of the present disclosure.

As one implementation, as shown in FIG. 8, a frequency priority may be configured by information interaction between a terminal device (e.g., UE), a base station (e.g., gNB) and a core network device (e.g., AMF or AUSF in a 5G core network).

In 810, it is determined that a terminal device is in a connected state and is about to enter an idle state or an inactive state.

Optionally, the inactive state is between a connected state and an idle state. In the inactive state, a terminal device has no connection with an access network device, but maintains a connection with a core network device, and the terminal device stores all or part of the information necessary for establishing/restoring a connection. Therefore, in the inactive state, when the terminal device needs to establish a connection, it may quickly establish/restore an RRC connection with the network according to the stored relevant information.

Optionally, when the terminal device is about to enter an idle state or an inactive state, it reports to a base station that it is about to enter an idle state or an inactive state.

Optionally, a base station determines that a terminal device is in a connected state and is about to enter an idle state or an inactive state.

In 820, a base station transmits request information to a core network device.

Optionally, a request is used for requesting a core network device to configure information of a frequency priority for a terminal device.

Optionally, a base station simultaneously transmits indication information to a core network device, which is used for indicating a state that a terminal device is about to enter.

Optionally, a state that a terminal device is about to enter includes an idle state or an inactive state.

Optionally, the frequency corresponding to the network slice registered by the terminal device is a frequency at which the terminal device preferentially resides.

Optionally, a core network device and a Non-Access Stratum (NAS) may recognize different network slices, that is, information of a network slice registered by the terminal device is stored on a core network side.

Optionally, the information of the frequency priority indicates information of an order of frequencies at which the terminal device may reside and which are sorted according to a priority.

In 830, the core network device configures information of a frequency priority.

Optionally, a core network device configures the information of the frequency priority according to information of a network slice registered by the terminal device and a tracking area identity (TAI) list of the terminal device, wherein a frequency corresponding to the network slice registered by the terminal device is a frequency at which the terminal device preferentially resides.

Optionally, if the TAI list includes one TA for the terminal device, information of a frequency priority in the TA for the terminal device is configured.

Optionally, if the TAI list includes a plurality of TAs for the terminal device, information of a frequency priority in a TA list for the terminal device is configured.

Optionally, an effective range of information of a frequency priority in a TA is within the TA, and an effective range of information of a frequency priority in a TA list is within all TAs in the TA list.

In 840, the core network device transmits the configured information of the frequency priority to the base station.

Optionally, a non-access stratum (NAS) message is transmitted to the base station, wherein the NAS message includes the information of the frequency priority.

Optionally, the effective range of the configured information of the frequency priority is transmitted to the base station.

In 850, the base station transmits the information of the frequency priority to the terminal device.

Optionally, a base station may transmit information of a frequency priority to a terminal device through a RRC signaling.

Optionally, a base station forwards a NAS message transmitted by a core network device, and the NAS message includes the information of the frequency priority.

In 860, it is determined whether to re-acquire or configure a frequency priority when the terminal device is crossing a TA or a TA list or leaving a RAN range according to an effective range of the information of the frequency priority.

Optionally, a terminal device in an idle state or an inactive state determines whether to re-acquire a frequency priority from a network side when entering a connected state, and when crossing a TA or a TA list or leaving a RAN range.

Optionally, a base station determines whether to reconfigure a frequency priority when a terminal device crosses a TA or a TA list or leaves a RAN range.

Optionally, a core network device determines whether to reconfigure a frequency priority when a terminal device crosses a TA or a TA list or leaves a RAN range.

Optionally, when a terminal device needs to re-acquire a frequency priority from a network side, the terminal device needs to re-enter a connected state, and at this time, a base station may reconfigure information of a frequency priority according to the latest state of the terminal device.

Therefore, in the method for configuring the frequency priority according to the implementation of the present disclosure, a base station transmits a request message to a core network device so that when configuring information of a frequency priority for a terminal device, the core network device considers a state that the terminal device is about to enter from a connected state, thus, a frequency at which the terminal device may reside may be effectively known, and thereby the information of the frequency priority may be configured more effectively.

Further, a core network device configures information of a frequency priority in a TA or information of a frequency priority in a TA list when the terminal device is about to enter an idle state from a connected state. When the terminal device in the idle state does not cross the TA or the TA list, unnecessary or redundant entry into the connected state to acquire the information of the frequency priority is avoided, thereby saving signaling overhead and energy consumption of the terminal device.

Figure 9:
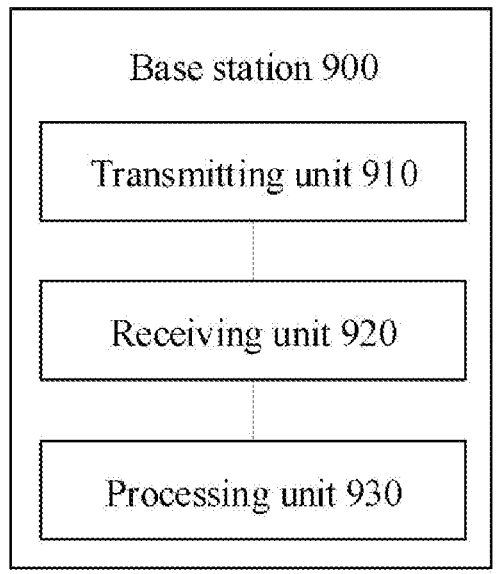
FIG. 9 is a schematic block diagram of a base station according to an implementation of the present disclosure.

FIG. 9 is a schematic block diagram of a base station 900 according to an implementation of the present disclosure. As shown in FIG. 9, the base station 900 includes: a transmitting unit 910, used for transmitting a first request message to a core network device, wherein the first request message is used for requesting information of a network slice registered by a terminal device, and a frequency corresponding to the network slice registered by the terminal device is a frequency at which the terminal device preferentially resides; a receiving unit 920, used for receiving a response message transmitted by the core network device for the first request message, wherein the response message includes information of the network slice registered by the terminal device; a processing unit 930, used for configuring information of a frequency priority for the terminal device according to the response message, wherein the information of the frequency priority indicates information of an order of frequencies at which the terminal device may reside and which are sorted according to a priority; wherein the transmitting unit 910 is further used for transmitting the configured information of the frequency priority to the terminal device.

Optionally, before the transmitting unit 910 transmits the request message to the core network device, the processing unit 930 is further used for determining that the terminal device is about to enter an idle state or an inactive state from a connected state.

Optionally, the processing unit 930 is further used for configuring information of a frequency priority in a tracking area (TA), or information of a frequency priority in a TA list, or information of a frequency priority in a radio access network (RAN) Notification Area for the terminal device according to the response message when the terminal device is about to enter an inactive state from a connected state.

An effective range of the information of the frequency priority in a TA is within the TA, an effective range of the information of the frequency priority in a TA list is within all TAs in the TA list, and an effective range of the information of the frequency priority in a radio access network (RAN) Notification Area is within the RAN notification area.

Optionally, the response message further includes a tracking area identity (TAI) list for the terminal device, and the TAI list includes information of all TAs of the terminal device; the processing unit 930 is further used for configuring information of a frequency priority in a TA, or information of a frequency priority in a TA list according to information of a network slice registered by the terminal device and the TAI list when the terminal device is about to enter an idle state from a connected state; wherein an effective range of the information of the frequency priority in a TA is within the TA, and an effective range of the information of the frequency priority in a TA list is within all TAs in the TA list.

Optionally, the processing unit 930 is further used for configuring information of a frequency priority in a TA for the terminal device if the TAI list includes one TA for the terminal device; or configuring information of a frequency priority in a TA list for the terminal device if the TAI list includes a plurality of TAs for the terminal device.

Optionally, the transmitting unit 910 is further used for transmitting the effective range of the information of the frequency priority to the terminal device.

Optionally, the transmitting unit 910 is further used for transmitting the configured information of the frequency priority to the terminal device through a radio resource control (RRC) signaling.

Optionally, the receiving unit 920 is further used for receiving a second request message transmitted by the terminal device, wherein the second request message is used for requesting reconfiguration of the information of the frequency priority; the processing unit 930 is further used for reconfiguring the information of the frequency priority according to the second request message.

Optionally, the core network device is AMF or AUSF.

It should be understood that the base station 900 according to the implementation of the present disclosure may correspond to the base station in the method 200 of the present disclosure, and the above-mentioned and other operations and/or functions of various units in the base station 900 are respectively for realizing the corresponding processes of the base station in the method 200 shown in FIG. 2, and will not be repeated here for brevity.

Figure 10:
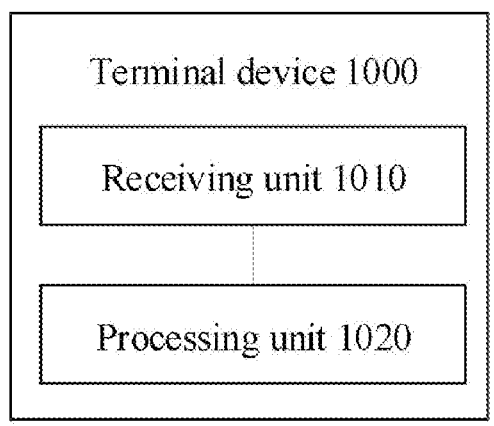
FIG. 10 is a schematic block diagram of a terminal device according to an implementation of the present disclosure.

FIG. 10 is a schematic block diagram of a terminal device 1000 according to an implementation of the present disclosure. As shown in FIG. 10, the terminal device 1000 includes a receiving unit 1010 and a processing unit 1020.

The receiving unit 1010 is used for receiving information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state;

The processing unit 1020 is used for selecting a frequency to reside at according to the information of the frequency priority when re-entering the connected state from the idle state or the inactive state.

Optionally, when an idle state is about to be entered from a connected state, the information of the frequency priority includes information of a frequency priority in a TA or information of a frequency priority in a TA list; or if an inactive state is about to be entered from a connected state, the information of the frequency priority includes information of a frequency priority in a TA, or information of a frequency priority in a TA list, or information of a frequency priority in a radio access network (RAN) notification area.

Optionally, the receiving unit 1010 is further used for receiving an effective range of the information of the frequency priority transmitted by the base station, wherein an effective range of the information of the frequency priority in a TA is within the TA, an effective range of the information of the frequency priority in a TA list is within all TAs in the TA list, and an effective range of the information of the frequency priority in the radio access network (RAN) Notification Area is within the RAN notification area.

Optionally, the terminal device 1000 further includes a transmitting unit 1030. If the information of the frequency priority is information of a frequency priority in a TA and the processing unit 1020 determines to cross the TA when re-entering a connected state, the transmitting unit 1030 transmits a request message to the base station, wherein the request message is used for requesting the base station to reconfigure the information of the frequency priority; or if the information of the frequency priority is information of a frequency priority in a TA list and the processing unit 1020 determines to cross the TA list when re-entering a connected state, the transmitting unit 1030 transmits a request message to the base station, wherein the request message is used for requesting the base station to reconfigure the information of the frequency priority; or if the information of the frequency priority is information of a frequency priority in a RAN Notification Area and the processing unit 1020 is not in the RAN notification area when determining to re-enter a connected state, the transmitting unit 1030 transmits a request message to the base station, wherein the request message is used for requesting the base station to reconfigure the information of the frequency priority.

It should be understood that the terminal device 1000 according to the implementation of the present disclosure may correspond to the terminal device in the method 300 of the present disclosure, and the above-mentioned and other operations and/or functions of various units in the terminal device 1000 are respectively for realizing the corresponding processes of the terminal device in the method 300 shown in FIG. 3, and will not be repeated here for brevity.

Figure 11:
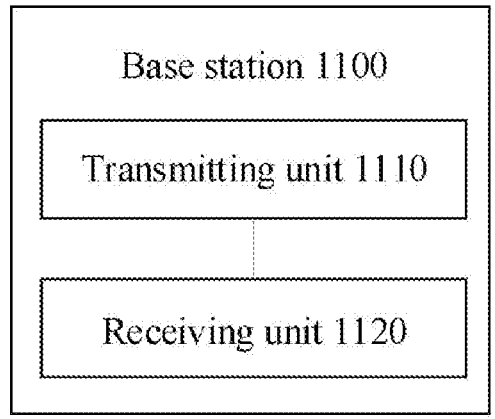
FIG. 11 is a schematic block diagram of a base station according to an implementation of the present disclosure.

FIG. 11 is a schematic block diagram of a base station 1100 according to an implementation of the present disclosure. As shown in FIG. 11, the base station 1100 includes: a transmitting unit 1110, used for transmitting a first request message to a core network device, wherein the first request message is used for indicating that a terminal device is about to enter an idle state or an inactive state from a connected state and requesting a configuration of information of a frequency priority for the terminal device, wherein the information of the frequency priority indicates information of an order of frequencies at which the terminal device may reside and which are sorted according to a priority; a receiving unit 1120, used for receiving the information of the frequency priority configured by the core network device;

wherein the transmitting unit 1110 is further used for transmitting the information of the frequency priority to the terminal device.

Optionally, the information of the frequency priority includes information of a frequency priority in a TA or information of a frequency priority in a TA list, wherein an effective range of information of a frequency priority in a TA is within the TA, and an effective range of information of a frequency priority in a TA list is within all TAs in the TA list.

Optionally, the transmitting unit 1110 is further used for transmitting an effective range of the information of the frequency priority to the terminal device.

Optionally, the receiving unit 1120 is further used for receiving a non-access stratum (NAS) message transmitted by the core network device, wherein the NAS message includes the information of the frequency priority configured by the core network device.

Optionally, the transmitting unit 1110 is further used for forwarding the NAS message to the terminal device.

Optionally, the transmitting unit 1110 is further used for transmitting a radio resource control (RRC) signaling to the terminal device, wherein the RRC signaling includes the information of the frequency priority.

Optionally, the receiving unit 1120 is further used for receiving a second request message transmitted by the terminal device, wherein the second request message is used for requesting reconfiguration of the information of the frequency priority; the transmitting unit 1110 is further used for transmitting a third request message to the core network device according to the second request message, wherein the third request message is used for requesting the core network device to reconfigure the information of the frequency priority.

Optionally, the core network device is AMF or AUSF.

It should be understood that the base station 1100 according to the implementation of the present disclosure may correspond to the base station in the method 400 of the present disclosure, and the above-mentioned and other operations and/or functions of various units in the base station 1100 are respectively for realizing the corresponding processes of the base station in the method 400 shown in FIG. 4, and will not be repeated here for brevity.

Figure 12:
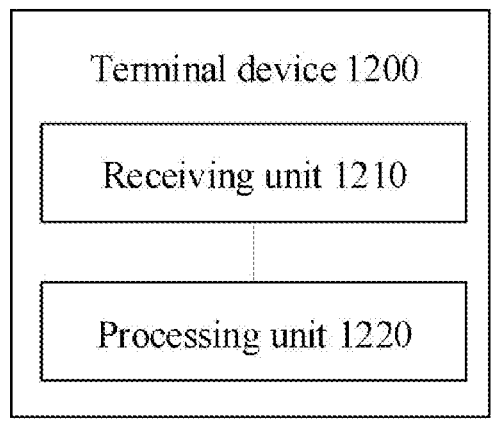
FIG. 12 is a schematic block diagram of a terminal device according to an implementation of the present disclosure.

FIG. 12 is a schematic block diagram of a terminal device 1200 according to an implementation of the present disclosure. As shown in FIG. 12, the terminal device 1200 includes a receiving unit 1210 and a processing unit 1220.

The receiving unit 1210 is used for receiving information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device may reside and which are sorted according to a priority, and the state that the terminal device is about to enter from the connected state includes an idle state or an inactive state; the processing unit 1220 is used for selecting a frequency to reside at according to the information of the frequency priority when re-entering the connected state from the idle state or the inactive state.

Optionally, the information of the frequency priority includes information of a frequency priority in a tracking area (TA) or information of a frequency priority in a TA list.

Optionally, the receiving unit 1210 is further used for receiving an effective range of the information of the frequency priority transmitted by the base station, wherein an effective range of the information of the frequency priority in a TA is within the TA, an effective range of the information of the frequency priority in a TA list is within all TAs in the TA list.

Optionally, the terminal device 1200 further includes: a transmitting unit 1230, used for transmitting a request message to the base station if the information of the frequency priority is information of a frequency priority in a TA and the processing unit determines to cross the TA when re-entering a connected state, wherein the request message is used for requesting reconfiguration of the information of the frequency priority; or the transmitting unit 1230 is further used for transmitting a request message to the base station if the information of the frequency priority is information of a frequency priority in a TA list and the processing unit determines to cross the TA list when re-entering a connected state, wherein the request message is used for requesting reconfiguration of the information of the frequency priority.

It should be understood that the terminal device 1200 according to the implementation of the present disclosure may correspond to the terminal device in the method 500 of the present disclosure, and the above-mentioned and other operations and/or functions of various units in the terminal device 1200 are respectively for realizing the corresponding processes of the terminal device in the method 500 shown in FIG. 5, and will not be repeated here for brevity.

Figure 13:
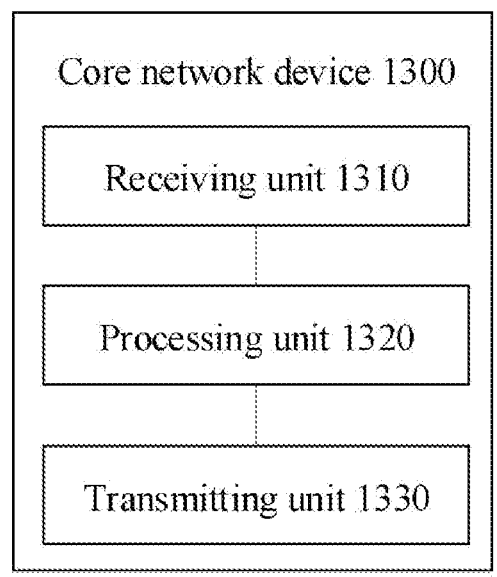
FIG. 13 is a schematic block diagram of a core network device according to an implementation of the present disclosure.

FIG. 13 is a schematic block diagram of a core network device 1300 according to an implementation of the present disclosure. As shown in FIG. 13, the core network device 1300 includes: a receiving unit 1310, used for receiving a first request message transmitted by a base station, wherein the first request message is used for indicating that a terminal device is about to enter an idle state or an inactive state from a connected state and requesting a configuration of information of a frequency priority for the terminal device, wherein the information of the frequency priority indicates information of an order of frequencies at which the terminal device may reside and which are sorted according to a priority; a processing unit 1320, used for configuring the information of the frequency priority according to information of a network slice registered by the terminal device and a tracking area identity (TAI) list of the terminal device, wherein a frequency corresponding to the network slice registered by the terminal device is a frequency at which the terminal device preferentially resides; and a transmitting unit 1330, used for transmitting the configured information of the frequency priority to the base station.

Optionally, if the TAI list includes one TA for the terminal device, the processing unit 1320 configures information of a frequency priority in the TA for the terminal device; or if the TAI list includes a plurality of TAs for the terminal device, the processing unit 1320 configures information of a frequency priority in a TA list for the terminal device; wherein an effective range of information of a frequency priority in a TA is within the TA, and an effective range of information of a frequency priority in a TA list is within all TAs in the TA list.

Optionally, the transmitting unit 1330 is further used for transmitting an effective range of the configured information of the frequency priority to the base station.

Optionally, the transmitting unit 1330 is further used for transmitting a non-access stratum (NAS) message to the base station, wherein the NAS message includes the information of the frequency priority.

Optionally, the receiving unit 1310 is further used for receiving a second request message transmitted by the base station, wherein the second request message is used for requesting reconfiguration of the information of the frequency priority for the terminal device; the processing unit 1320 is further used for reconfiguring the information of the frequency priority according to the second request message.

Optionally, the core network device is AMF or AUSF.

It should be understood that the core network device 1300 according to the implementation of the present disclosure may correspond to the core network device in the method 600 of the present disclosure, and the above-mentioned and other operations and/or functions of various units in the core network device 1300 are respectively in order to realize the corresponding processes of the core network device in the method 600 shown in FIG. 6, and will not be repeated here for the sake of brevity.

Figure 14:
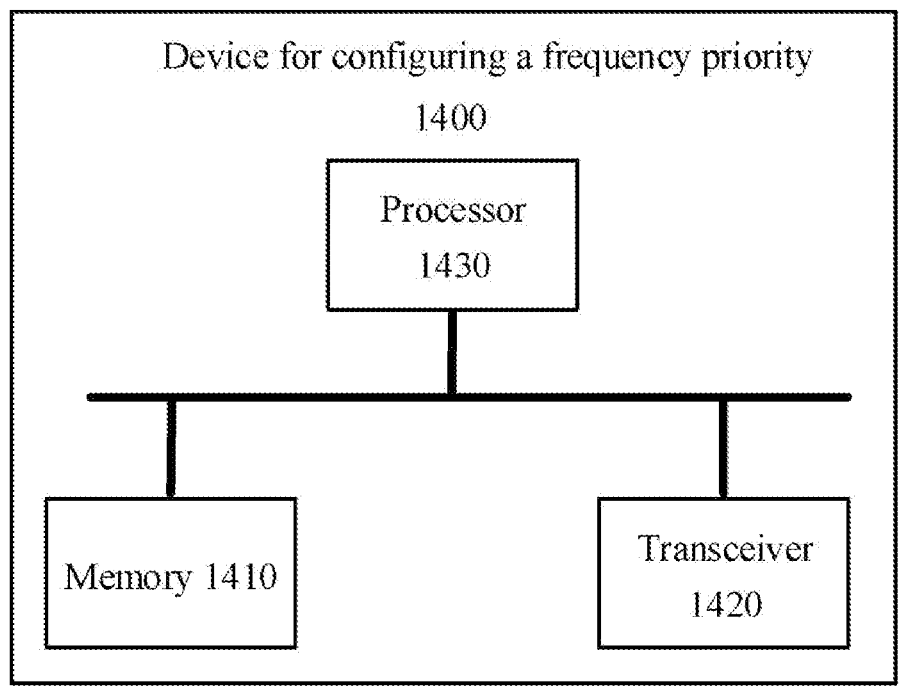
FIG. 14 shows a schematic block diagram of a device for configuring a frequency priority provided by an implementation of the present disclosure.

FIG. 14 shows a schematic block diagram of a device 1400 for configuring a frequency priority provided by an implementation of the present disclosure, the device 1400 includes: a memory 1410 for storing a program including codes; a transceiver 1420 for communicating with other devices; and a processor 1430 for executing program codes in the memory 1410.

The transceiver 1420 is used for performing specific transmitting and receiving of signals under the driving of the processor 1430.

Optionally, when the codes are executed, the processor 1430 may also implement various operations performed by the base station in the method 200 in FIG. 2 or the method 400 in FIG. 4, which will not be repeated here for brevity. At this time, the device 1400 may be a base station (e.g., an access network device).

Optionally, when the codes are executed, the processor 1430 may implement various operations performed by the terminal device in the method 300 in FIG. 3 or the method 500 in FIG. 5, and will not be described in detail herein for the sake of brevity. At this time, the device 1400 may be a terminal device (e.g., a cell phone).

Optionally, when the codes are executed, the processor 1430 may also implement various operations performed by the core network device in the method 600 in FIG. 6, which will not be repeated here for brevity. At this time, the device 1400 may be a core network device (e.g., a 5G core network).

It should be understood that in the implementation of the present disclosure, the processor 1430 may be a Central Processing Unit (CPU), or the processor 1430 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 1410 may include a read only memory and a random access memory, and provide instructions and data to the processor 1430. A portion of memory 1410 may also include a non-volatile random access memory. For example, the memory 1410 may also store the type information of a device.

The transceiver 1420 may be used for implementing signal transmission and reception functions, such as frequency modulation and demodulation functions, or up-conversion and down-conversion functions.

In the implementation process, at least one act of the method may be completed by an integrated logic circuit of hardware in the processor 1430, or the integrated logic circuit may complete the at least one act under the driving of instructions in a form of software. Therefore, the device 1400 for configuring a frequency priority may be a chip or a chip set. The acts of the method disclosed in connection with the implementation of the present disclosure may be directly embodied to be completed by an execution of a hardware processor or by a combination of hardware and software modules in a processor. The software modules may be located in a storage medium commonly used in the art, such as a random access memory, flash memory, read-only memory, programmable read-only memory or electrically erasable programmable memory, or register. The storage medium is located in the memory, and the processor 1430 reads the information in the memory and accomplishes the acts of the method with its hardware. In order to avoid repetition, it will not be described in detail here.

Figure 15:
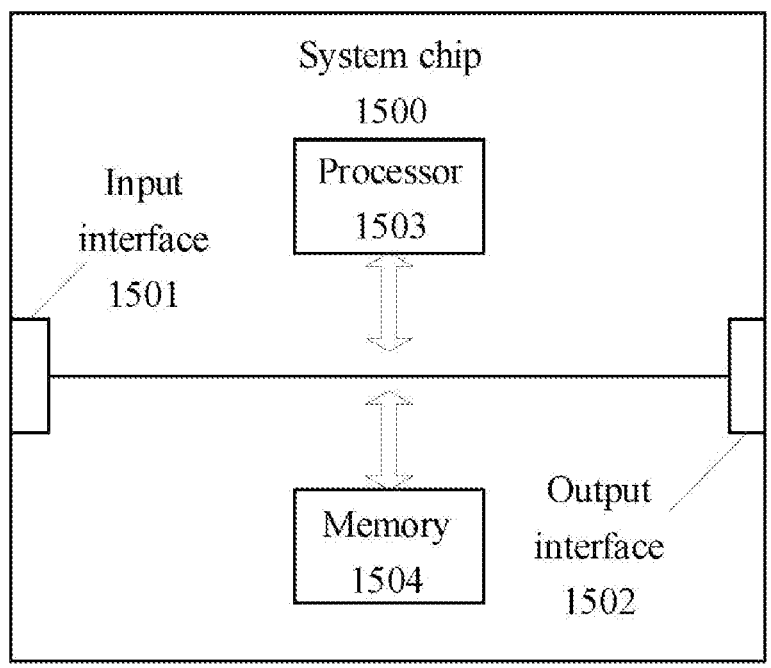
FIG. 15 is a schematic structural diagram of a system chip according to an implementation of the present disclosure.

FIG. 15 is a schematic block diagram of a system chip 1500 according to an implementation of the present disclosure. The system chip 1500 of FIG. 15 includes an input interface 1501, an output interface 1502, a processor 1503 and a memory 1504, and the processor 1503 and the memory 1504 may be connected through internal communication connection lines, and the processor 1503 is used for executing codes in the memory 1504.

Optionally, when the codes are executed, the processor 1503 implements the method executed by the terminal device in the method implementation. For the sake of brevity, it will not be repeated here.

Optionally, when the codes are executed, the processor 1503 implements the method executed by the base station in the method implementation. For the sake of brevity, it will not be repeated here.

Optionally, when the codes are executed, the processor 1503 implements the method executed by the core network device in the method implementation. For the sake of brevity, it will not be repeated here.

Those of ordinary skill in the art may recognize that various exemplary units and algorithm acts described in the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art may clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed system, apparatus and method may be realized in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate unit may or may not be physically separated, and the component shown as a unit may or may not be a physical unit, i.e., it may be located in one place or may be distributed over multiple network units. Some or all of the units may be selected according to actual needs to achieve the purpose of solutions of the implementations of the present disclosure.

In addition, various functional units in various implementations of the present disclosure may be integrated in one processing unit, or they may be physically present in each unit alone, or two or more units may be integrated in one unit.

The functions may be stored in a computer readable storage medium if implemented in the form of software functional units and sold or used as separate products. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The aforementioned storage medium includes: U disk, mobile hard disk, read-only memory (ROM), random access memory (RAM), magnetic disk or optical disk, and other medium capable of storing program codes.

What are described above are merely exemplary implementations of the present disclosure, but the protection scope of the present disclosure is not limited thereto. Any change or substitute that may be easily conceived by a person skilled in the art within the technical scope disclosed by the present disclosure shall be included within the protection scope of the present disclosure. Therefore, the protection scope of the present disclosure shall be the protection scope defined by the claims.

What we claim is:

1. A method for configuring a frequency priority, comprising:
    receiving, by a terminal device, information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device is able to reside and which are sorted according to a priority, and the state that the terminal device is about to enter from the connected state comprises an idle state or an inactive state; and
    selecting, by the terminal device, a frequency to reside at according to the information of the frequency priority when re-entering the connected state from the idle state or the inactive state;
    wherein if the idle state is about to be entered from the connected state, the information of the frequency priority comprises information of a frequency priority in a tracking area (TA) or information of a frequency priority in a TA list; or
    wherein if the inactive state is about to be entered from the connected state, the information of the frequency priority comprises information of a frequency priority in a TA, or information of a frequency priority in a TA list, or information of a frequency priority in a radio access network (RAN) notification area.

2. The method according to claim 1, wherein the method further comprises:
    receiving, by the terminal device, an effective range of the information of the frequency priority transmitted by the base station, wherein an effective range of the information of the frequency priority in a TA is within the TA, an effective range of the information of the frequency priority in a TA list is within all TAs in the TA list, and an effective range of the information of the frequency priority in a RAN Notification Area is within the RAN notification area.

3. The method according to claim 1, wherein the method further comprises:
    transmitting, by the terminal device, a request message to the base station if the information of the frequency priority is the information of the frequency priority in a TA and the terminal device determines to cross the TA when re-entering the connected state, wherein the request message is used for requesting the base station to reconfigure the information of the frequency priority; or
    transmitting, by the terminal device, a request message to the base station if the information of the frequency priority is the information of the frequency priority in a TA list and the terminal device determines to cross the TA list when re-entering the connected state, wherein the request message is used for requesting the base station to reconfigure the information of the frequency priority; or
    transmitting, by the terminal device, a request message to the base station if the information of the frequency priority is the information of the frequency priority in a RAN Notification Area and the terminal device is not in the RAN Notification Area when determining to re-enter the connected state, wherein the request message is used for requesting the base station to reconfigure the information of the frequency priority.

4. The method according to claim 1, wherein,
the information of the frequency priority comprises information of a frequency priority in a tracking area (TA) or information of a frequency priority in a TA list.

5. A base station, comprising:
a transceiver, used for transmitting a first request message to a core network device, wherein the first request message is used for requesting information of a network slice registered by a terminal device, and a frequency corresponding to the network slice registered by the terminal device is a frequency at which the terminal device preferentially resides; and
used for receiving a response message transmitted by the core network device for the first request message, wherein the response message comprises the information of the network slice registered by the terminal device; and
a processor, used for configuring information of a frequency priority for the terminal device according to the response message, wherein the information of the frequency priority indicates information of an order of frequencies at which the terminal device is able to reside and which are sorted according to a priority,
wherein the transceiver is further used for transmitting the configured information of the frequency priority to the terminal device,
wherein before the transceiver transmits the request message to the core network device, the processor is further used for determining that the terminal device is about to enter an idle state or an inactive state from a connected state,
wherein the processor is further used for configuring information of a frequency priority in a tracking area (TA), or information of a frequency priority in a TA list, or information of a frequency priority in a radio access network (RAN) Notification Area for the terminal device according to the response message when the terminal device is about to enter the inactive state from the connected state, and wherein an effective range of the information of the frequency priority in a TA is within the TA, an effective range of the information of the frequency priority in a TA list is within all TAs in the TA list, and an effective range of the information of the frequency priority in a RAN Notification Area is within the RAN notification area.

6. The base station according to claim 5, wherein the response message further comprises a tracking area identity (TAI) list for the terminal device, and the TAI list comprises information of all TAs of the terminal device;

the processor is further used for configuring information of a frequency priority in a TA, or information of a frequency priority in a TA list for the terminal device according to the information of the network slice registered by the terminal device and the TAI list when the terminal device is about to enter an idle state from a connected state, wherein an effective range of the information of the frequency priority in a TA is within the TA, and an effective range of the information of the frequency priority in a TA list is within all TAs in the TA list.

7. The base station according to claim 6, wherein the processor is further used for configuring the information of the frequency priority in a TA for the terminal device if the TAI list comprises one TA for the terminal device; or configuring the information of the frequency priority in a TA list for the terminal device if the TAI list comprises a plurality of TAs for the terminal device.

8. The base station according to claim 5, wherein the transceiver is further used for transmitting the effective range of the information of the frequency priority to the terminal device.

9. The base station according to claim 5, wherein the transceiver is further used for transmitting the configured information of the frequency priority to the terminal device through a radio resource control (RRC) signaling.

10. The base station according to claim 5, wherein,
the transceiver is further used for receiving a second request message transmitted by the terminal device, wherein the second request message is used for requesting reconfiguration of the information of the frequency priority; and
the processor is further used for reconfiguring the information of the frequency priority according to the second request message.

11. The base station according to claim 5, wherein the core network device is an access and mobility management function (AMF) or an authentication server function (AUSF).

12. A terminal device, comprising:
a transceiver, used for receiving information of a frequency priority transmitted by a base station, wherein the information of the frequency priority is determined according to information of a network slice registered by the terminal device and a state that the terminal device is about to enter from a connected state, wherein the information of the frequency priority indicates information of an order of frequencies at which the terminal device is able to reside and which are sorted according to a priority, and the state that the terminal device is about to enter from the connected state comprises an idle state or an inactive state; and a processor, used for selecting a frequency to reside at according to the information of the frequency priority when re-entering the connected state from the idle state or the inactive state;

wherein if the idle state is about to be entered from the connected state, the information of the frequency priority comprises information of a frequency priority in a tracking area (TA) or information of a frequency priority in a TA list; or wherein if the inactive state is about to be entered from the connected state, the information of the frequency priority comprises information of a frequency priority in a TA, or information of a frequency priority in a TA list, or information of a frequency priority in a radio access network (RAN) notification area.

13. The terminal device according to claim 12, wherein the transceiver is further used for receiving an effective range of the information of the frequency priority transmitted by the base station, wherein an effective range of the information of the frequency priority in a TA is within the TA, an effective range of the information of the frequency priority in a TA list is within all TAs in the TA list, and an effective range of the information of the frequency priority in the RAN Notification Area is within the RAN notification area.

14. The terminal device claim 12, wherein,
transmitting, by the transceiver, a request message to the base station if the information of the frequency priority is the information of the frequency priority in a TA and the processor determines to cross the TA when re-entering the connected state, wherein the request message is used for requesting the base station to reconfigure the information of the frequency priority; or transmitting, by the transceiver, a request message to the base station if the information of the frequency priority is the information of the frequency priority in a TA list and the processor determines to cross the TA list when re-entering the connected state, wherein the request message is used for requesting the base station to reconfigure the information of the frequency priority; or transmitting, by the transceiver, a request message to the base station if the information of the frequency priority is the information of the frequency priority in the RAN Notification Area and the processor is not in the RAN Notification Area when determining to re-enter the connected state, wherein the request message is used for requesting the base station to reconfigure the information of the frequency priority.

15. The terminal device according to claim 12, wherein, the information of the frequency priority comprises information of a frequency priority in a tracking area (TA) or information of a frequency priority in a TA list.

16. The terminal device according to claim 15, wherein the transceiver is further used for receiving an effective range of the information of the frequency priority transmitted by the base station, wherein an effective range of the information of the frequency priority in a TA is within the TA, and an effective range of the information of the frequency priority in a TA list is within all TAs in the TA list.

\* \* \* \* \*